United States Patent
Nakamura

(10) Patent No.: US 12,429,934 B2
(45) Date of Patent: Sep. 30, 2025

(54) FEEDING SYSTEM WITH CONNECTION MEMBERS HAVING VARYING LENGTHS AND NUMBER OF PARALLEL CONNECTION LINES

(71) Applicant: JAPAN AVIATION ELECTRONICS INDUSTRY, LIMITED, Tokyo (JP)

(72) Inventor: Kazunobu Nakamura, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 106 days.

(21) Appl. No.: 17/737,194

(22) Filed: May 5, 2022

(65) Prior Publication Data

US 2022/0397947 A1 Dec. 15, 2022

(30) Foreign Application Priority Data

Jun. 14, 2021 (JP) ................................. 2021-098788

(51) Int. Cl.
| | |
|---|---|
| *G06F 1/26* | (2006.01) |
| *G06F 1/18* | (2006.01) |
| *G06F 1/3234* | (2019.01) |
| *G06F 13/38* | (2006.01) |
| *H01R 13/66* | (2006.01) |
| *H01R 24/60* | (2011.01) |

(52) U.S. Cl.
CPC .............. *G06F 1/26* (2013.01); *G06F 13/382* (2013.01); *H01R 13/6675* (2013.01); *G06F 1/189* (2013.01); *G06F 1/266* (2013.01); *G06F 1/3253* (2013.01); *G06F 2213/0042* (2013.01); *H01R 24/60* (2013.01)

(58) Field of Classification Search
CPC .......... G06F 1/26; G06F 1/266; G06F 1/3253; G06F 1/189; G06F 2213/0042; G06F 13/382; H01R 13/6675; H01R 24/60
USPC ................................. 713/300; 710/100, 305
See application file for complete search history.

(56) References Cited

U.S. PATENT DOCUMENTS

| | | | |
|---|---|---|---|
| 5,136,695 A | * | 8/1992 | Goldshlag ............. G06F 3/1415 345/545 |
| 9,727,067 B2 | | 8/2017 | Fujiwara et al. |

(Continued)

FOREIGN PATENT DOCUMENTS

| | | |
|---|---|---|
| JP | 2006147181 A | 6/2006 |
| JP | 2014117077 A | 6/2014 |

(Continued)

OTHER PUBLICATIONS

European Office Action dated Jul. 25, 2023 issued in counterpart European Application No. 22172641.7.

(Continued)

*Primary Examiner* — Ji H Bae
(74) *Attorney, Agent, or Firm* — Holtz, Holtz & Volek PC

(57) ABSTRACT

Each of a feeding unit and a connector unit is provided with power supply ports and ground ports. In at least one of a connection of the power supply ports of the feeding unit and the power supply ports of the connector unit and a connection of the ground ports of the feeding unit and the ground ports of the connector unit, the number of parallel lines in at least a partial section is changed according to a length of the connection. In this way, a voltage drop between the feeding unit and the connector unit is adjusted.

10 Claims, 3 Drawing Sheets

(56) References Cited

U.S. PATENT DOCUMENTS

| | | | |
|---|---|---|---|
| 2004/0164707 A1 | 8/2004 | Veselic et al. | |
| 2011/0193411 A1 | 8/2011 | Lam et al. | |
| 2015/0015078 A1* | 1/2015 | Kim | H03H 17/0248 |
| | | | 307/103 |
| 2016/0291663 A1* | 10/2016 | Sun | G06F 13/4022 |
| 2019/0007647 A1* | 1/2019 | Wen | H04N 7/102 |
| 2019/0356070 A1* | 11/2019 | Lu | H01R 12/7088 |
| 2022/0147477 A1* | 5/2022 | Azam | G06F 3/0486 |
| 2022/0214732 A1* | 7/2022 | Dai | G06F 1/26 |

FOREIGN PATENT DOCUMENTS

| | | |
|---|---|---|
| JP | 2016045760 A | 4/2016 |
| JP | 2017045162 A | 3/2017 |
| JP | 2018148621 A | 9/2018 |
| JP | 2019004554 A | 1/2019 |
| JP | 2019154129 A | 9/2019 |
| JP | 2020010428 A | 1/2020 |
| JP | 2020042532 A | 3/2020 |
| JP | 2020135940 A | 8/2020 |
| WO | 2016143541 A1 | 9/2016 |

OTHER PUBLICATIONS

Extended European Search Report (EESR) dated Nov. 4, 2022, issued in counterpart European Application No. 22172641.7.

\* cited by examiner

_(54)_ FEEDING SYSTEM WITH CONNECTION MEMBERS HAVING VARYING LENGTHS AND NUMBER OF PARALLEL CONNECTION LINES

CROSS REFERENCE TO RELATED APPLICATIONS

This application is based on and claims priority under 35 U.S.C. § 119 to Japanese Patent Application No. JP2021-098788 filed Jun. 14, 2021, the contents of which are incorporated herein in their entirety by reference.

BACKGROUND OF THE INVENTION

This invention relates to a connection method of connecting a feeding unit to a connector unit, relates to a feeding system provided with the feeding unit and the connector unit, and relates to the connector unit and the feeding unit which are used in the feeding system.

JP2020-10428A (Patent Document 1) discloses an example of a feeding device (a feeding system) conformable to Universal Serial Bus (USB) standards. This feeding device is a feeding device for vehicle or automobile use.

As shown in FIG. 6, a feeding device 90 disclosed in Patent document 1 is provided with an in-vehicle device (a feeding unit) 92 and an open-to-user portion (a connector unit) 94. The in-vehicle device 92 and the open-to-user portion 94 are connected to each other with a cable 96.

An installation position of the in-vehicle device 92 in a vehicle (not shown) and an installation position of the open-to-user portion 94 in the vehicle depend on a structure of the vehicle. Accordingly, it is highly possible that a distance between the in-vehicle device 92 and the open-to-user portion 94, or a length of the cable 96, varies from one type of vehicle to another type of vehicle. This means that there is a possibility that a voltage supplied to the open-to-user portion 94 varies from one type of vehicle to another type of vehicle. Patent Document 1 further discloses a voltage adjusting method for supplying a predetermined voltage to the open-to-user portion 94 without depending on the length of the cable 96.

SUMMARY OF THE INVENTION

The voltage adjusting method of Patent Document 1 detects a voltage supplied to the open-to-user portion 94 and adjusts an output voltage adjustment resistance in the in-vehicle device 92 according to the detection results. This method has a problem which needs a complicated structure in the feeding device 90 and causes an increase of a cost of the feeding device 90. Accordingly, there is a demand for a feeding system which can supply a predetermined voltage from a feeding unit to a connector unit with a simpler structure.

It is an object of the present invention to provide a connection method which can supply a predetermined voltage from a feeding unit to a connector unit with a simpler structure. In addition, it is another object of the present invention to provide a feeding system employing such a connection method and to provide a feeding unit and a connector unit which are used in the feeding system.

One aspect of the present invention provides a connection method of connecting a feeding unit provided with a power supply circuit with a connector unit provided with a connector to be connected to a user device. Each of the feeding unit and the connector unit is provided with a power supply port and a ground port. The method comprises, in at least one of a connection of the power supply port of the feeding unit and the power supply port of the connector unit and a connection of the ground port of the feeding unit and the ground port of the connector unit, adjusting a voltage drop between the feeding unit and the connector unit by changing number of parallel lines in at least a partial section according to a length of the connection.

Another aspect of the present invention provides a feeding system which comprises a feeding unit provided with a power supply circuit, and a connector unit provided with a connector to be connected to a user device. Each of the feeding unit and the connector unit is provided with three or more specific ports which comprise at least one power supply port and at least one ground port. At least one of number of the at least one power supply port and number of the at least one ground port is plural. An electric resistance between the feeding unit and the connector unit is capable of being adjusted by selecting number of connections between the specific ports of the feeding unit and the specific ports of the connector unit.

Yet another aspect of the present invention provides a feeding system which comprises a feeding unit provided with a power supply circuit, a connector unit provided with a connector to be connected to a user device, and a connection member connecting the feeding unit with the connector unit. Each of the feeding unit and the connector unit is provided with one power supply port and one ground port. The connection member comprises a power supply port connection member connecting the power supply port of the feeding unit with the power supply port of the connector unit, and a ground port connection member connecting the ground port of the power supply unit with the ground port of the connector unit. At least one of the power supply port connection member and the ground port connection member is selected among plural kinds of connection member options which are different from each other in number of lines for connection of a middle section thereof according to a distance between the power supply unit and the connector unit.

Still another aspect of the present invention provides a connector unit for a feeding system in which a feeding unit provided with a power supply circuit and the connector unit provided with a connector to be connected to a user device are connected by a cable. The connector unit is provided with three or more specific ports which comprise at least one power supply port and at least one ground port and which respectively correspond to three or more specific ports included in the feeding unit and comprising at least one power supply port and at least one ground port.

Still another aspect of the present invention provides a feeding unit for a feeding system in which the feeding unit provided with a power supply circuit and a connector unit provided with a connector to be connected to a user device are connected by a cable. The feeding unit is provided with three or more specific ports which comprise at least one power supply port and at least one ground port and which respectively correspond to three or more specific ports included in the connector unit and comprising at least one power supply port and at least one ground port.

The connection method of the present invention changes the number of parallel lines included in the connection between the feeding unit and the connector unit according to the length of the connection to adjust a voltage drop between the feeding unit and the connector. In this way, the predetermined voltage can be supplied to the connector unit regardless of the length of the connection between the feeding unit and the connector unit.

The connection method of the present invention may be applied to at least one of the connection between the power port of the feeding unit and the power port of the connector unit and the connection between the ground port of the feeding unit and the ground port of the connector unit. In addition, the connection method of the present invention may be applied to at least a partial section of the connection between the feeding unit and the connector unit. In this way, the voltage drop between the feeding unit and the connector unit can be adjusted at relatively small steps.

If a cross-sectional area (or a diameter) of a line included in a cable connecting the feeding unit and the connector unit is changed, it is possible to adjust the voltage drop between the feeding unit and the connector unit. However, though increasing the diameter of the line included in the cable reduces the electric resistance of the line, it might cause inconvenience, such as deterioration of flexibility of the line, on wiring. In contrast, the present invention selectively combines the lines at least in the partial section of the lines so that the electric resistance or voltage drop between the feeding unit and the connector unit can be adjusted according to the distance between the feeding unit and the connector unit without reducing the flexibility of the lines.

An appreciation of the objectives of the present invention and a more complete understanding of its structure may be had by studying the following description of the preferred embodiment and by referring to the accompanying drawings.

Figure 1:
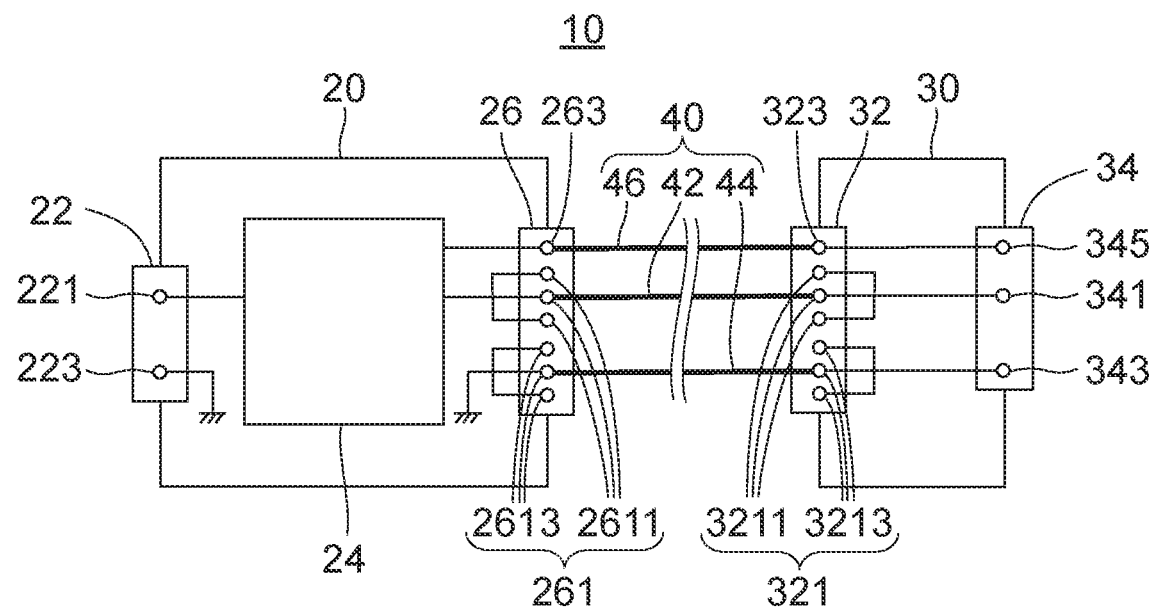
FIG. 1 is a first schematic diagram showing a feeding system according to a first embodiment of the present invention. A feeding unit and a connector unit are connected to each other by using a first cable.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

Referring to FIG. 1, a feeding system 10 according to a first embodiment of the present invention is provided with a feeding unit 20 and a connector unit 30. The feeding unit 20 and the connector unit 30 are connected to each other through a first cable (a connection member) 40.

As shown in FIG. 1, the feeding unit 20 has an input portion 22, a power circuit 24 and an output portion 26.

As shown in FIG. 1, the input portion 22 of the feeding unit 20 is provided with a power terminal 221 and a ground terminal 223. An outer power supply (not shown) which supplies a predetermined input voltage is connected to the power terminal 221 and the ground terminal 223.

As shown in FIG. 1, the output portion 26 of the feeding unit 20 is provided with three or more specific ports 261 and a communication port 263. The specific ports 261 consist of one or more power supply ports 1611 and one or more ground ports 2613. Here, at least one of the number of the power supply port(s) 2611 and the number of the ground port(s) 2613 is a plural number. In the present embodiment, each of the number of the power supply ports 2611 and the number of the ground ports 2613 is three. However, the present invention is not limited thereto. At least one of the number of the power supply port(s) 2611 and the number of the ground port(s) 2613 should be a plural number, and the number of the power supply port(s) 2611 and the number of the ground port(s) 2613 may be different from each other. Moreover, in the present invention, the communication port 263 is not essential.

As shown in FIG. 1, the plural ports which are included in the specific ports 261 and which have the same functions are connected to one another in the feeding unit 20. In other words, the three power supply ports 2611 are connected to one another in the feeding unit 20, and the three ground ports 2613 are connected to one another in the feeding unit 20. With this structure, the three power supply ports 2611 are given with the same output voltages from the power circuit 24. Moreover, the three ground ports 2613 are given with the same reference voltages (GND).

As shown in FIG. 1, the power circuit 24 is connected between the input portion 22 and the output portion 26. In the present embodiment, the power circuit 24 is connected, in the feeding unit 20, to the power terminal 221 of the input portion 22, to the power supply ports 2611 of the output portion 26 and to the communication port 263 of the output portion 26. The power circuit 24 voltage-converts an input voltage inputted to the input portion 22 to a converted voltage and supplies the converted voltage to the output portion 26 as an output voltage.

In the present embodiment, the power circuit 24 includes a voltage conversion and power supply circuit (not shown) conformable to Universal Serial Bus Power Delivery (USB PD) standards. In this case, the power circuit 24 carries out the voltage conversion according to information obtained from a user device (not shown) through the connector unit 30, the first cable 40 and the communication port 263. In the present embodiment, the communication port 263 is used for carrying out communication conformable to the USB PD standards. However, the present invention is not limited thereto. The power circuit 24 may not be conformable to the USB PD standards. In that case, the communication port 263 may be unnecessary. At any rate, the power circuit 24 produces one predetermined voltage or selectively outputs one of plural predetermined voltages. Additionally, structure of the power circuit 24 is not related to the present invention directly, and therefore the detailed description thereof will be omitted.

As shown in FIG. 1, the connector unit 30 is provided with an input portion 32 and a connector 34 to which the user device (not shown) is connected. The connector 34 is a connector conformable to USB Type-C standards, for example. In the present embodiment, the connector 34 has at least a power supply terminal 341, a ground terminal 343 and a communication terminal 345. However, the present invention is not limited thereto. The connector 34 may not be conformable to the USB Type-C standards. Nevertheless, in that case, the connector 34 must correspond to the power circuit 24 of the feeding unit 20.

As understood from FIG. 1, the input portion 32 of the connector unit 30 is formed to be the same as the output portion 26 of the feeding unit 20. In detail, the input portion 32 is provided with three or more specific ports 321 and a communication port 323. The specific ports 321 consist of one or more power supply ports 3211 and one or more ground ports 3213. Moreover, at least one of the number of the power supply port(s) 3211 and the number of the ground port(s) 3213 is a plural number. In the present embodiment, each of the number of the power supply ports 3211 and the number of the ground ports 3213 is three. The power supply ports 3211 are connected to one another in the connector unit 30, and the ground ports 3213 are connected to one another in the connector unit 30. Moreover, the power supply ports 3211, the ground ports 3213 and the communication port 323 are connected to the connector 34 in the connector unit 30. In detail, the power supply ports 3211 are connected to the power supply terminal 341 of the connector 34, the ground ports 3213 are connected to the ground terminal 343 of the connector 34, and the communication port 323 is connected to the communication terminal 345 of the connector 34.

In FIG. 1, the first cable 40 has one power supply connection line (a power supply port connection member) 42, one ground connection line (a ground port connection member) 44 and one communication connection line (a communication port connection member) 46. Electrical characteristics of the power supply connection line 42 and electrical characteristics of the ground connection line 44 may be or not may be the same as each other. Moreover, electrical characteristics of the communication connection line 46 may be the same as the electrical characteristics of the power supply connection line 42 or the electrical characteristics of the ground connection line 44 or may not be the same as the electrical characteristics of the power supply connection line 42 or the electrical characteristics of the ground connection line 44.

As shown in FIG. 1, the communication connection line 46 connects the communication port 263 of the output portion 26 of the feeding unit 20 and the communication port 323 of the input portion 32 of the connector unit 30 to each other. Moreover, the power supply connection line 42 connects one of the power supply ports 2611 of the output portion 26 of the feeding unit 20 and one of the power supply ports 3211 of the input portion 32 of the connector unit 30 to each other. Furthermore, the ground connection line 44 connects one of the ground ports 2613 of the output portion 26 of the feeding unit 20 and one of the ground ports 3213 of the input portion 32 of the connector unit 30 to each other.

As understood from FIG. 1, an output voltage generated by the power circuit 24 of the feeding unit 20 is supplied to the connector unit 30 through the first cable 40. At this time, according to an electric resistance of the first cable 40, a voltage drop is caused. In other words, according to a length of the first cable 40, a voltage supplied to the connector unit 30 is changed. In order to set the voltage supplied to the connector unit 30 from the feeding unit 20 to a predetermined value, the present embodiment uses the first cable 40 or any of other cables described below according to a distance between the feeding unit 20 and the connector unit 30.

Figure 2:
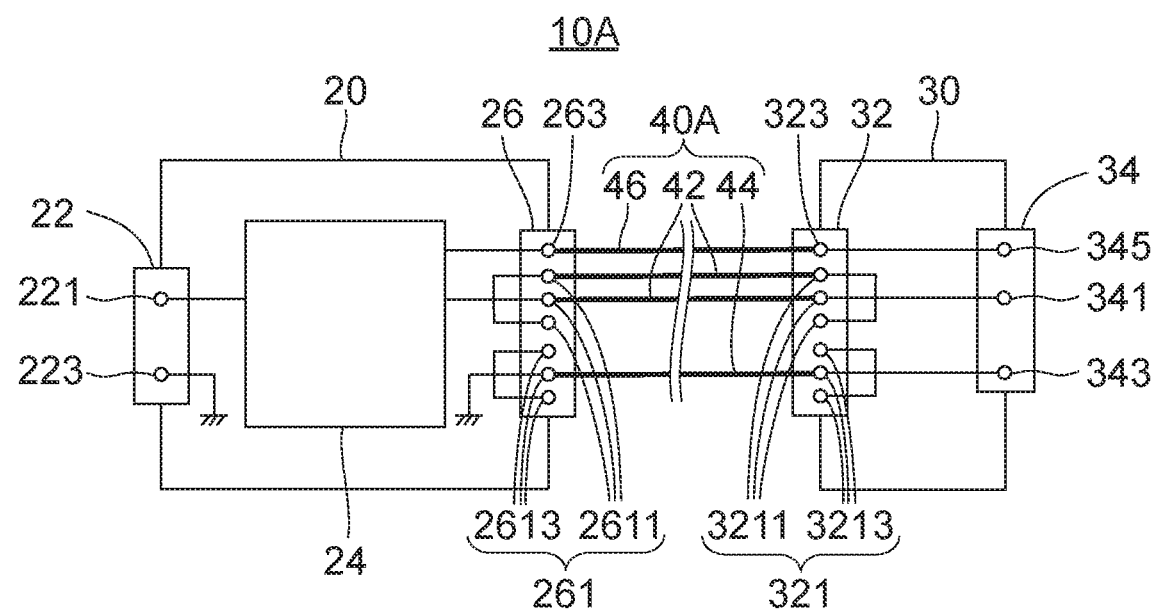
FIG. 2 is a second schematic diagram showing the feeding system of FIG. 1. The feeding unit and the connector unit are connected to each other by using a second cable.

Referring to FIG. 2, a feeding system 10A has a second cable (a connection member) 40A different from the first cable 40 of the feeding system 10 of FIG. 1. A feeding unit 20 and a connector unit 30 in the feeding system 10A are the same things as the feeding unit 20 and the connector unit 30 of FIG. 1, respectively.

As shown in FIG. 2, the second cable 40A has two power supply lines (power supply port connection members) 42, one ground connection line (ground port connection member) 44 and one communication connection line (communication port connection member) 46. Each of the power supply connection lines 42, the ground connection line 44 and the communication connection line 46 are the same things as the power supply connection line 42, the ground connection line 44 and the communication connection line 46, respectively. In the present embodiment, the two power supply connection lines 42 have the same electrical characteristics as each other. However, the present invention is not limited thereto. The power supply connection lines 42 may have electrical characteristics different from each other.

As shown in FIG. 2, each of the power supply connection lines 42 connects one of the power supply ports 2611 of the feeding unit 20 and one of the power supply ports 3211 of the connector unit 30 to each other. Here, the power supply ports 2611 of the feeding unit 20 are connected to one another, and the power supply ports 3211 of the connector unit 30 are connected to one another. Accordingly, the two power supply connection lines 42 form parallel lines which are connected to each other in parallel.

As understood from FIGS. 1 and 2, a voltage drop per unit length of the second cable 40A in the feeding system 10A of FIG. 2 is smaller than a voltage drop per unit length of the first cable 40 in the feeding system 10 of FIG. 1. Accordingly, even when a length of the second cable 40A is longer than the length of the first cable 40, an electric resistance or a voltage drop between the power supply ports 2611 of the feeding unit 20 and the power supply ports 3211 of the connector unit 30 in the feeding system 10A of FIG. 2 can be adjusted to the same level as an electric resistance or a voltage drop of the feeding system 10. Therefore, the feeding system 10A can supply a predetermined voltage to the connector unit 30 by using the second cable 40A.

Figure 3:
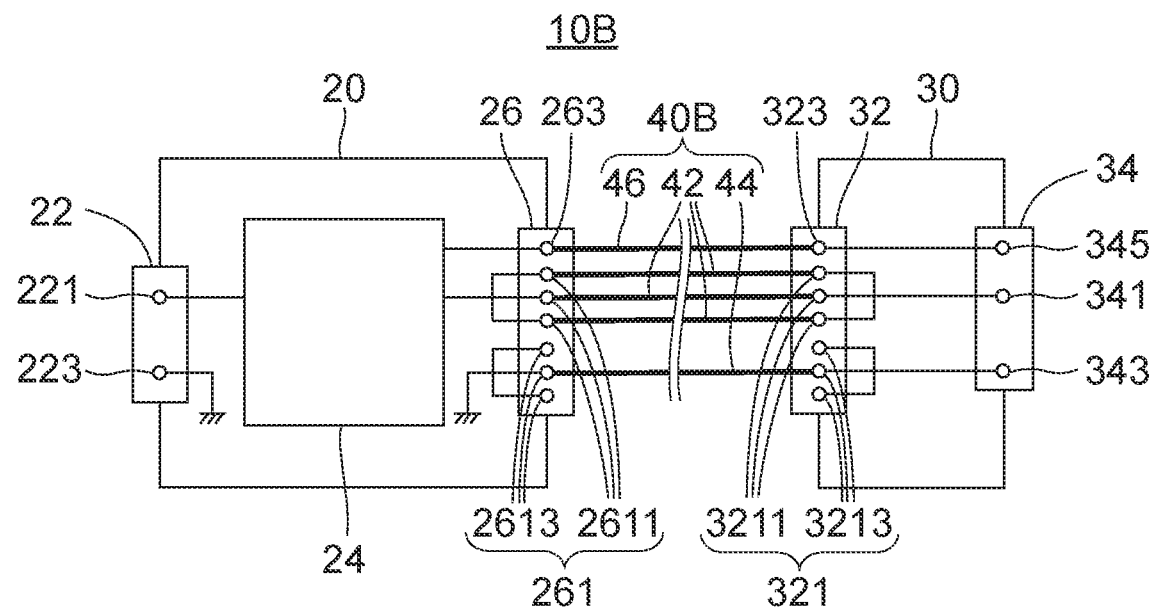
FIG. 3 is a third schematic diagram showing the feeding system of FIG. 1. The feeding unit and the connector unit are connected to each other by using a third cable.

Referring to FIG. 3, a feeding system 10B has a third cable 40B which is different from the first cable 40 of the feeding system 10 of FIG. 1 and the second cable 40A of the feeding system 10A of FIG. 2. A feeding unit 20 and a connector unit 30 in the feeding system 10B are the same things as the feeding unit 20 and the connector unit 30 of FIG. 1, respectively.

As shown in FIG. 3, the third cable (connection member) 40B has three power supply connection lines (power supply port connection members) 42, one ground connection line (ground port connection member) 44 and one communication connection line (communication port connection member) 46. Each of the power supply connection lines 42, the ground connection line 44 and the communication connection line 46 are the same things as the power supply connection line 42, the ground connection line 44 and the communication connection line 46 of FIG. 1, respectively. In the present embodiment, the three power supply connection lines 42 have the same electrical characteristics as one another. However, the present invention is not limited thereto. The power supply connection lines 42 may have electrical characteristics different from each other. Moreover, two of the power supply connection lines 42 may have electrical characteristics which are the same as each other and different from that of the remaining one of the power supply connection lines 42.

As shown in FIG. 3, each of the power supply connection lines 42 connects one of the power supply ports 2611 of the feeding unit 20 and one of the power supply ports 3211 of the connector unit 30 to each other. Here, the power supply ports 2611 of the feeding unit 20 are connected to one another, and the power supply ports 3211 of the connector unit 30 are connected to one another. Accordingly, the three power supply connection lines 42 form parallel lines which are connected to one another in parallel.

As understood from FIGS. 2 and 3, a voltage drop per unit length of the third cable 40B in the feeding system 10B of FIG. 3 is further smaller than the voltage drop per unit length of the second cable 40A in the feeding system 10A of FIG. 2. Accordingly, even when a length of the third cable 40B is further longer than the length of the second cable 40A, an electric resistance or a voltage drop between the power supply ports 2611 of the feeding unit 20 and the power supply ports 3211 of the connector unit 30 in the feeding system 10B of FIG. 3 can be adjusted to the same level as the electric resistance or the voltage drop of the feeding system 10A. Therefore, the feeding system 10B can supply a predetermined voltage to the connector unit 30 by using the third cable 40B.

As understood from the description mentioned above, the electric resistance or the voltage drop between the power supply ports 2611 of the feeding unit 20 and the power supply ports 3211 of the connector unit 30 can be adjusted by selecting the number of the power supply connection lines 42 (the number of connections) between the power supply ports 2611 of the feeding unit 20 and the power supply ports 3211 of the connector unit 30. In particular, the electric resistance between the power supply ports 2611 of the feeding unit 20 and the power supply ports 3211 of the connector unit 30 can be adjusted to the same level by selecting the number of connections between the power supply ports 2611 of the feeding unit 20 and the power supply ports 3211 of the connector unit 30 according to a distance between the feeding unit 20 and the connector unit 30. Thus, the feeding system 10, 10A or 10B according to the present embodiment can supply the predetermined voltage to the connector unit 30 regardless of the distance between the feeding unit 20 and the connector unit 30.

Additionally, there is a method which changes a diameter of the power supply connection line 42 as an adjusting method of the electric resistance or the voltage drop between the power supply port 2611 of the feeding unit 20 and the power supply port 3211 of the connector unit 30. However, though increasing the diameter of the power supply connection line 42 reduces the electric resistance, disadvantage of wiring, such as reduction of flexibility, might be caused. Accordingly, it is more effective to select the number of connections than to change the diameter of the power supply connection line 42.

In the aforementioned embodiment, the electric resistance or the voltage drop between the power supply ports 2611 of the feeding unit 20 and the power supply ports 3211 of the connector unit 30 is adjusted by selecting the number of the power supply connection lines 42. However, the present invention is not limited thereto. For example, the number of the power supply connection line 42 may be set to one, and the number of the ground connection lines 44 may be selected. In that case, an electric resistance or a voltage drop between the ground ports 2613 of the feeding unit 20 and the ground ports 3213 of the connector unit 30 is adjusted. Alternatively, both of the number of the power supply connection lines 42 and the number of the ground connection lines 44 may be selected. In that case, the power supply connection lines 42 and the ground connection lines 44 must have the same electrical characteristics, and the number of the power supply connection lines 42 selected and the number of the ground connection line 44 selected must be the same as each other. In this way, the electric resistance between the feeding unit 20 and the connector unit 30 can be adjusted by selecting the number of connections between the specific ports 261 of the feeding unit 20 and the specific ports 321 of the connector unit 30.

In the aforementioned embodiment, the ports 261 and 263 of the output portion 26 of the feeding unit 20 and the ports 321 and 323 of the input portion 32 of the connector unit 30 have the same structures as one another. However, the present invention is not limited thereto. The ports 261 and 263 may have different structure, such as different sizes, from each other. The ports may have different sizes from each other even if having the same function. For example, the power supply ports 2611 and/or the ground ports 2613 may be used for a thick connection line, a middle connection line and a thin connection line. In that case, as the power supply connection lines 42 or the ground connection lines 44, the thick connection line, the middle connection line and the thin connection line can be selectively combined to be used. In this way, the number of choices regarding the electric resistance or the voltage drop can be increased in comparison with a case where the number of the power supply connection lines 42 same as each other or the ground connection lines 44 same as each other is selected.

Second Embodiment

Figure 4:
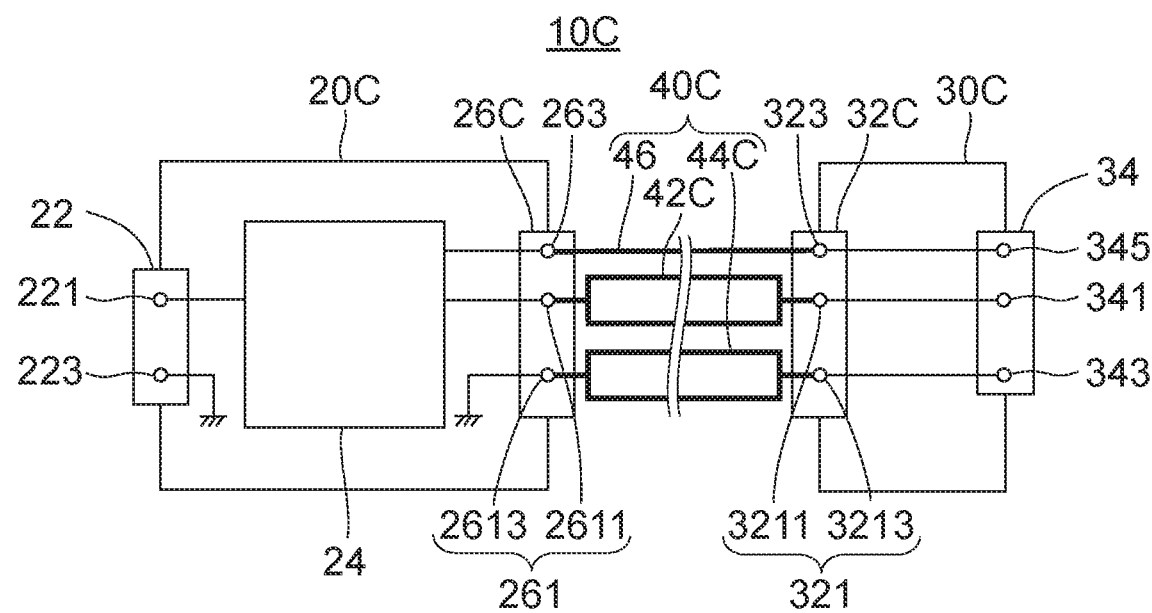
FIG. 4 is a schematic diagram showing a feeding system according to a second embodiment of the present invention. A feeding unit and a connector unit are connected to each other by using a fourth cable.

Referring to FIG. 4, a feeding system 10C according to a second embodiment of the present invention is provided with a feeding unit 20C and a connector unit 30C. Moreover, the feeding system 10C is provided with a fourth cable (connection member) 40C connecting the feeding unit 20C and the connector unit 30C to each other.

As shown in FIG. 4, an output portion 26C of the feeding unit 20C is different from the output portion 26 of the feeding unit 20 of the first embodiment. In detail, the output portion 26C of the feeding unit 20C is provided with one power supply port 2611, one ground port 2613 and one communication port 263. Except for this point, the feeding unit 20C is formed in the same manner as the feeding unit 20 of the first embodiment. Moreover, an input portion 32C of the connector unit 30C is different from the input portion 32 of the connector unit 30 of the first embodiment. In detail, the input portion 32C of the connector unit 30C is provided with one power supply port 3211, one ground port 3213 and one communication port 323. Except for this point, the connector unit 30C is formed in the same manner as the connector unit 30 of the first embodiment.

As shown in FIG. 4, the fourth cable 40C is provided with a power supply connection line (power supply port connection member) 42C, which connects the power supply port 2611 of the feeding unit 20C and the power supply port 3211 of the connector unit 30C to each other, and a ground connection line (ground port connection member) 44C, which connects the ground port 2613 of the feeding unit 20C and the ground port 3213 of the connector unit 30C to each other. In addition, the fourth cable 40C is provided with a communication connection line (communication port connection member) 46 which connects the communication port 263 of the feeding unit 20C and the communication port 323 of the connector unit 30C to each other.

As understood from FIG. 4, the power supply connection line 42C of the fourth cable 40C has a pair of branching-joining portions, and two lines are connected between the branching-joining portions (in a middle section) in parallel. In this manner, in a partial section of the power supply connection line 42C, by providing a double parallel line section in which two lines are connected in parallel, an electric resistance or a voltage drop between the power supply port 2611 of the feeding unit 20C and the power supply port 3211 of the connector unit 30C can be smaller than that in a case of connecting by using a single line. The same is applied to the ground connection line 44C of the fourth cable 40C.

Figure 5:
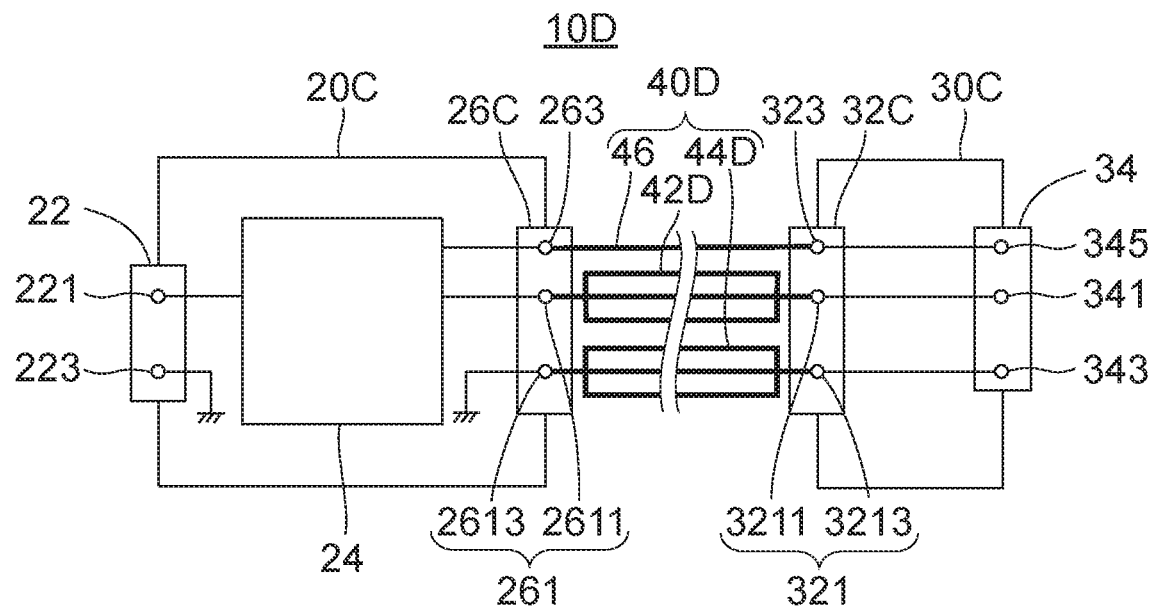
FIG. 5 is another schematic diagram showing the feeding system of FIG. 4. The feeding unit and the connector unit are connected to each other by using a fifth cable.
Figure 6:
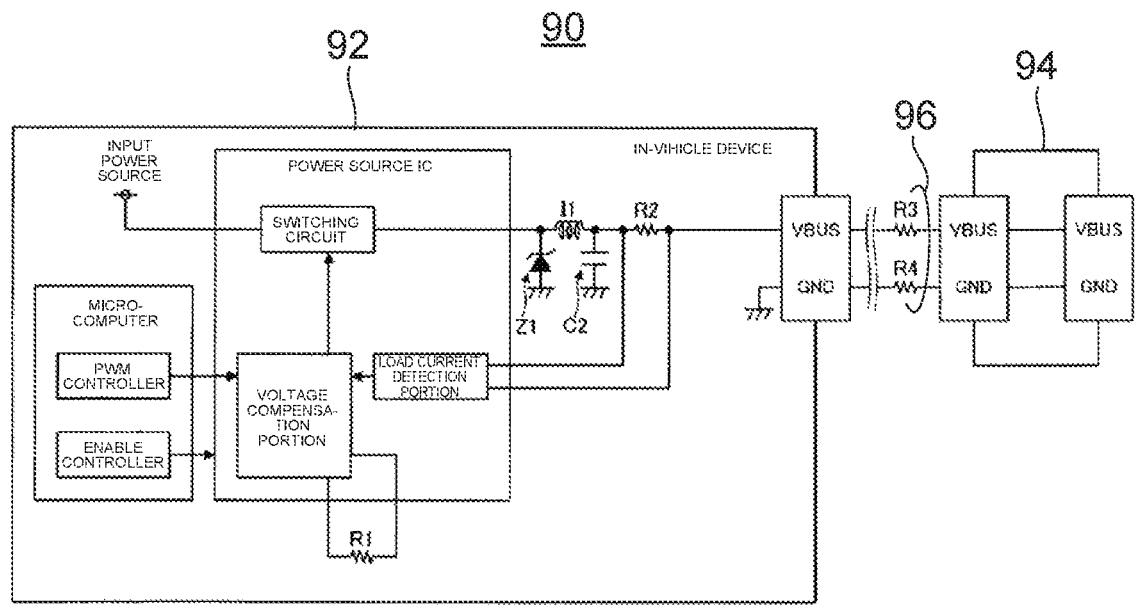
FIG. 6 is a schematic diagram showing a feeding device disclosed in Patent Document 1.

Referring to FIG. 5, a feeding system 10D is provided with a fifth cable 40D different from the fourth cable 40C of the feeding system 10C of FIG. 4. In detail, a power supply connection line 42D of the fifth cable 40D has a pair of branching-joining portions, and three lines are connected between the branching-joining portions (in a middle section) in parallel. In this manner, in a partial section of the power supply connection line 42D, by providing a triple parallel line section in which three lines are connected in parallel, an electric resistance or a voltage drop between the power supply port 2611 of the feeding unit 20C and the power supply port 3211 of the connector unit 30C can be smaller than that in a case of connecting with a single line or the cable having the double parallel line portion. The same is applied to the ground connection line 44D of the fifth cable 40D.

As understood from FIGS. 4 and 5, even when a length of the fifth cable 40D is longer than a length of the fourth cable 40C, the electric resistance or the voltage drop in the fifth cable 40D can be adjusted in the same level as the electric resistance or the voltage drop in the fourth cable 40C. This means that, by selecting the number of the lines which are connected in parallel in the middle section according to the distance between the feeding unit 20C and the connector unit 30C, the predetermined voltage can be supplied to the connector unit 30C regardless of the distance between the feeding unit 20C and the connector unit 30C. In other words, similarly to the first embodiment, also in the present embodiment, regardless of the distance between the feeding unit 20C and the connector unit 30C, the predetermined voltage can be supplied to the connector unit 30C.

In the aforementioned embodiment, the number of the parallel lines in the power supply connection line 42C or 42D is two or three. However, the present invention is not limited thereto. In the present invention, the number of line(s) (parallel lines) in the middle section in the power supply connection line should be at least one. The same is applied to the ground connection line.

Moreover, in the aforementioned embodiment, the number of the parallel lines of the power supply connection line 42C or 42D and the number of the parallel lines of the ground connection line 44C or 4D are equal to each other. However, the present invention is not limited thereto. In the present invention, the number of the parallel lines in the power supply connection line and the number of the parallel lines in the ground connection line may be different from each other.

As understood from the description mentioned above, in the present embodiment, at least one of the power supply port connection member and the ground port connection member is selected among a plurality of connection member options of plural kinds which are different from one another in the number of plural lines connecting the middle section according to the distance between the feeding unit 20C and the connector unit 30C. In this way, the predetermined voltage can be supplied to the connector unit 30C regardless of the distance between the feeding unit 20C and the connector unit 30C.

As mentioned above, the present invention can adjust the electric resistance or the voltage drop between the feeding unit 20 or 20C and the connector unit 30 or 30C by changing the number of the parallel lines at least in a partial section according to the length of connection thereof in at least one of a connection between the power supply ports 2611 of the feeding unit 20 or 20C and the power supply ports 3211 of the connector unit 30 or 30C and a connection between the ground ports 2613 of the feeding unit 20 or 20C and the ground ports 3213 of the connector unit 30 or 30C. In this way, the predetermined voltage can be supplied to the connector unit 30 or 30C regardless of the distance between the feeding unit 20 or 20C and the connector unit 30 or 30C.

Although the specific explanation about the present invention is made above with reference to the embodiments, the present invention is not limited thereto but susceptible of various modifications and alternative forms without departing from the spirit of the invention. For example, the feeding unit 20 and the connector unit 30 in the first embodiment may be combined with the fourth cable 40C or the fifth cable 40D in the second embodiment. In that case, the number of the power supply ports 2611 and 3211, the ground ports 2613 and 3213, and the number of the parallel lines in the cable may be freely changed.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A method of manufacturing plural connection members having different specifications, each of the connection members being configured to connect a feeding unit to a connector unit, the feeding unit comprising a power supply circuit, the connector unit comprising a connector configured to receive an input connection from a user device, and each of the feeding unit and the connector unit comprising a power supply port and a ground port, the method comprising:

manufacturing the connection members such that each connection member, when connected between the feeding unit and the connector unit, obtains a predetermined voltage drop between the feeding unit and the connector unit, each of the connection members comprising a plurality of parallel connection lines including at least one first connection line configured to connect between the power supply port of the feeding unit and the power supply port of the connector unit and at least one second connection line configured to connect between the ground port of the feeding unit and the ground port of the connector unit, and the first connection line and the second connection line being different from each other, wherein the plurality of connection members are manufactured to differ from each other in terms of at least one of (i) a length thereof and (ii) a number of the parallel connection lines included therein, the number of parallel connection lines in each of the connection members being selected based on its length such that the predetermined voltage drop between the feeding unit and the connector unit is obtained when each connection member is connected between the feeding unit and the connector unit.

2. The method as recited in claim 1, wherein;
the connector unit includes at least three ports including the power supply port and the ground port of the connector unit,
the feeding unit includes at least three ports including the power supply port and the ground port of the feeding unit, and
the at least three ports of the connector unit respectively correspond to the at least three ports of the feeding unit.

3. The method as recited in claim 2, wherein:
the connector is a connector which conforms to Universal Serial Bus (USB) standards;
the connector unit further comprises a communication port;
the communication port of the connector unit is connected to the connector in the connector unit; and
the communication port of the connector unit is configured to connect to a communication port provided in the feeding unit to carry out communication which conforms to the USB standards.

4. A feeding system comprising:
a feeding unit comprising a power supply circuit;
a connector unit comprising a connector configured to receive a connection from a user device; and
a connection member connecting between the feeding unit and the connector unit, the connection member having a number of parallel connection lines included therein, wherein:
each of the feeding unit and the connector unit comprises at least three specific ports including at least one power supply port and at least one ground port;
at least one of a number of the at least one power supply port and a number of the at least one ground port is plural;
the parallel connection lines of the connection member include at least one first connection line connecting between one of the at least one power supply port of the feeding unit and one of the at least one power supply port of the connector unit and at least one second connection line connecting between one of the at least one ground port of the feeding unit and one of the at least one ground port of the connector unit, the first connection line and the second connection line being different from each other; and
the connection member is a connection member manufactured such that the number of parallel connection lines included therein is selected based on its length to obtain a predetermined electric resistance between the feeding unit and the connector unit between which the connection member connects.

5. The feeding system as recited in claim 4, wherein in each of the feeding unit and the connector unit, plural ports having a same function which are included in the specific ports are connected to each other.

6. The feeding system as recited in claim 4, wherein:
in each of the feeding unit and the connector unit, the number of the at least one power supply port is equal to the number of the at least one ground port, and
the number of the at least one power supply port is at least two.

7. The feeding system as recited in claim 4, wherein:
the feeding unit comprises a feeding circuit which conforms to Universal Serial Bus (USB) standards; and
the connector unit comprises a connector which conforms to the USB standards.

8. A feeding system comprising:
a feeding unit comprising a power supply circuit;
a connector unit comprising a connector configured to receive a connection from a user device; and
a connection member connecting between the feeding unit and the connector unit, the connection member having a number of parallel connection lines included therein, wherein:
each of the feeding unit and the connector unit is provided with one power supply port and one ground port;
the connection member includes (i) a power supply port connection member connecting the one power supply port of the feeding unit with the one power supply port of the connector unit, and (ii) a ground port connection member connecting the one ground port of the feeding unit with the one ground port of the connector unit;
each power supply port connection member comprises (i) end portions each comprising a single connection line and respectively connected to the one power supply port of the feeding unit and the one power supply port of the connector unit, and (ii) a middle portion between the end portions and connected to the end portions, the middle portion comprising at least two parallel connection lines;
each ground port connection member comprises (i) end portions each comprising a single connection line and respectively connected to the one ground port of the feeding unit and the one ground port of the connector unit, and (ii) a middle portion between the end portions and connected with the end portions, the middle portion including at least two parallel connection lines; and
the connection member is a connection member manufactured such that a number of the at least two parallel connection lines included in the middle portion of at least one of the power supply port connection member and the ground port connection member thereof is selected based on a length of the connection member to obtain a predetermined voltage drop between the feeding unit and the connector unit between which the connection member connects.

9. The feeding system as recited in claim 8, wherein:
the feeding unit comprises at least three ports including the one power supply port and the one ground port of the feeding unit,
the connector unit comprises at least three ports including the one power supply port and the one ground port of the connector unit, and
the at least three ports of the feeding unit respectively correspond to the at least three ports of the connector unit.

10. The feeding system as recited in claim 9, wherein:
the power supply circuit comprises a feeding circuit which conforms to Universal Serial Bus (USB) standards;
the feeding unit further comprises a communication port; and
the communication port of the feeding unit is configured to connect to a communication portion provided in the connector unit to carry out communication which conforms to the USB standards.

* * * * *